United States Patent
Benayahu et al.

(10) Patent No.: US 7,576,925 B2
(45) Date of Patent: Aug. 18, 2009

(54) SYSTEM FOR INCREASING HORIZONTAL FIELD OF VIEW OF A CAMERA

(75) Inventors: Yair Benayahu, Camon (IL); Eliezer Rosenblum, Haifa (IL); Paula Ines Roit, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 12/203,187

(22) Filed: Sep. 3, 2008

(65) Prior Publication Data

US 2009/0080092 A1 Mar. 26, 2009

(30) Foreign Application Priority Data

Sep. 23, 2007 (IL) .................................. 186173

(51) Int. Cl.
*G02B 13/06* (2006.01)
*G02B 17/00* (2006.01)
*G02B 5/08* (2006.01)
*H04N 7/00* (2006.01)

(52) U.S. Cl. .................... 359/725; 359/726; 359/850; 348/36; 348/218.1

(58) Field of Classification Search ................. 359/725, 359/726, 850; 348/36, 218.1, 335, 369
See application file for complete search history.

(56) References Cited

U.S. PATENT DOCUMENTS

| 4,288,819 | A |   | 9/1981 | Williams |
|---|---|---|---|---|
| 5,532,737 | A |   | 7/1996 | Braun |
| 5,631,778 | A | * | 5/1997 | Powell ........................ 359/724 |
| 5,790,181 | A |   | 8/1998 | Chahl et al. |
| 6,115,193 | A | * | 9/2000 | Shu ............................ 359/725 |
| 7,477,284 | B2 | * | 1/2009 | Peleg et al. ................... 348/53 |

FOREIGN PATENT DOCUMENTS

IL 186173 9/2007

* cited by examiner

*Primary Examiner*—William C Choi
*Assistant Examiner*—Jack Dinh
(74) *Attorney, Agent, or Firm*—Mark M. Friedman

(57) ABSTRACT

A terrestrial imaging device includes an objective lens which accepts light within an intrinsic angular field of view onto a focal plane and two pairs of plane mirrors. The first pair of plane mirrors reflects a first light incoming ray sequentially to produce first and second reflected light rays within a roughly horizontal plane, the second reflected ray being focused by the objective lens on the focal plane. The second pair of plane mirrors reflects a second incoming ray sequentially to produce third and fourth reflected light rays within a roughly vertical plane, the fourth reflected light ray being focused by the objective lens on the focal plane.

8 Claims, 5 Drawing Sheets

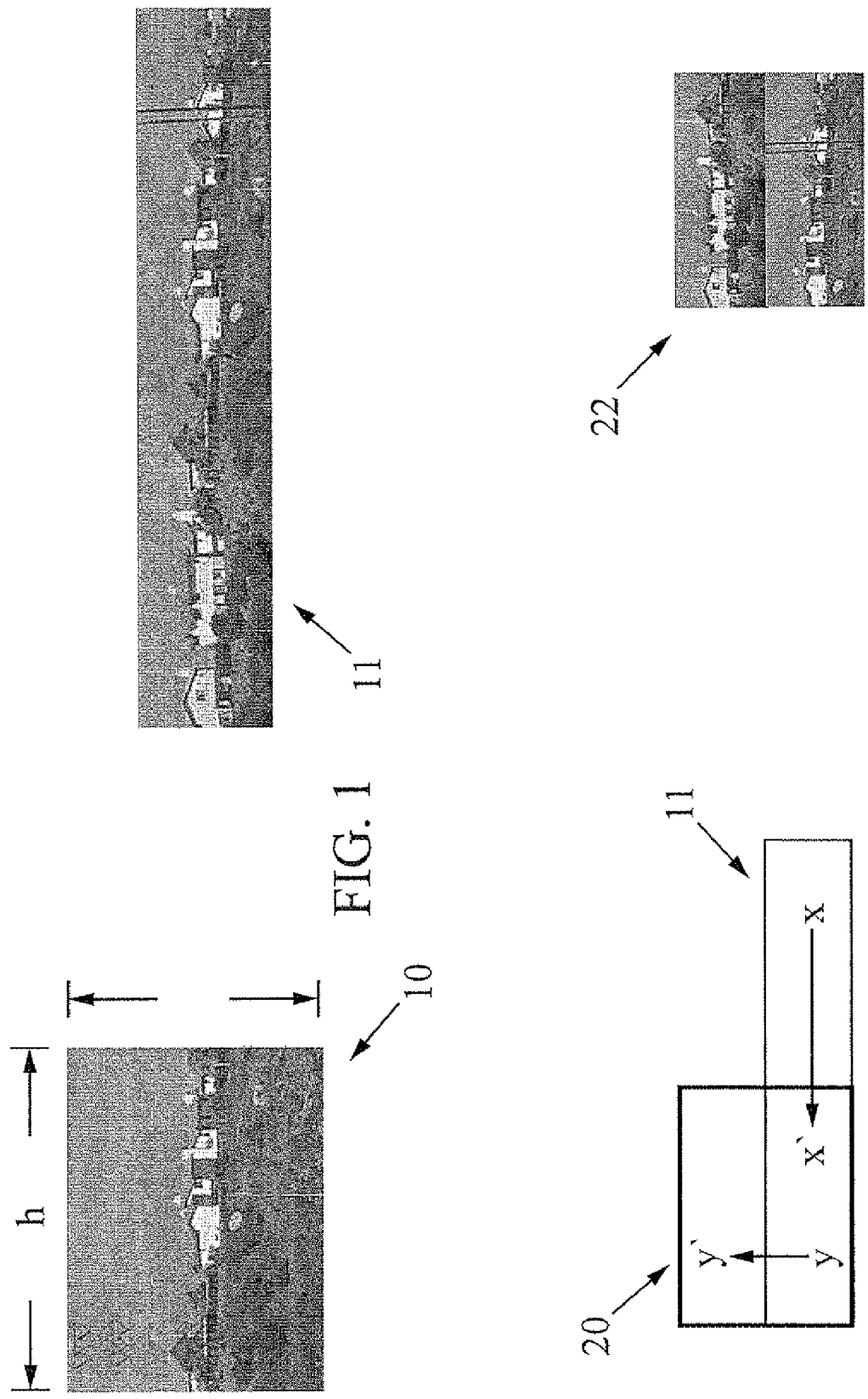

SYSTEM FOR INCREASING HORIZONTAL FIELD OF VIEW OF A CAMERA

FIELD AND BACKGROUND OF THE INVENTION

The present invention relates to a system added onto and assembled with a conventional camera. The system increases the horizontal field of view of the camera and decreases the vertical field of view of the camera. The system is characterized by at least two pairs of plane mirrors.

Standard optical instruments, cameras and terrestrial viewing systems, such as telescopes and binoculars are typically configured to have the same horizontal and vertical fields of view because optical instruments are typically constructed with spherical optics.

In terrestrial surveillance systems, a larger horizontal field view is preferred, so that more of the horizon may be imaged without having to adjust, e.g. rotate, the instrument around a vertical axis.

Thus there is a need for and it would be very advantageous to have a simple optical system which may be added onto a standard camera, which increases the horizontal field of view of the camera at the expense of the vertical field of view without requiring an internal modification of the camera.

Prior art solutions for increasing the field of view of a camera include, using more than one camera A representative prior art reference which discloses use of more than one camera for increasing the field of view is U.S. Pat. No. 5,532,737. Another prior art method for increasing the field of view of a camera, without modifying the camera uses external curved mirrors. A representative prior art reference which discloses an external convex mirror for increasing the field of view is U.S. Pat. No. 5,790,181.

U.S. Pat. No. 4,288,819 discloses a multi-field imaging device for directing light from a first optical field and a separated second optical field into a video camera used for security surveillance thereby reproducing a split-screen image with the video camera. The multi-field imaging device can be aligned whereby light from the second optical field is directed directly onto one side of an image plane. A pair of mirrors are adjusted so that light from the first optical field is reflected by the mirrors to the image plane in a juxtaposed relation with the light from the second optical field. The image plane is positioned at a predetermined distance from a lens of the video camera whereby images directed on the image plane are reproduced by the video camera

SUMMARY OF THE INVENTION

The term "field of view" as used herein, refers to an angle subtended by the objects imaged in the camera. A term "vertical field of view" as used herein is the angle subtended vertically by the objects imaged in the camera. The term "horizontal field of view" as used herein is the angle subtended horizontally by the objects imaged in the camera. Although the term "horizontal" refers to the horizon and is typically parallel to the horizon and in a preferred embodiment the present invention increases the "horizontal field of view" paralle to the horizon, the present invention in other embodiments may be used to extend a vertical field of view, simply by rotating the system by ninety degrees, for instance if the system of the present invention is being used to observe rock climbers on a vertical cliff. The term "field of view as used herein is angular, so that the terms "field of view" and "angular field of view" are used herein interchangeably. The term "field of view" as used herein refers to the full angle or twice the half angle measured from the optical axis. The term "intrinsic field of view" as used herein refers to the angular field of view of a terrestrial viewing device or camera, which defines an acceptance angle of optical rays imaged onto the detector (or into the eye). The intrinsic angular field of view of a terrestrial viewing device or camera is typically approximated by a dimension (e.g. radius) of the detector (or aperture) at the focal plane) divided by the focal length of the objective lens of the terrestrial viewing device. The term "terrestrial viewing device" includes but is not limited to cameras for infrared or visible, or any viewing instrument, e.g. binoculars with a wide intrinsic angular field of view, greater than ten degrees.

The terms "lower" as in lower portion of an image and "upper" as in upper portion of an image are used herein also in the non-inverted sense, that is from the point of view of a person viewing the image and not with respect to the camera frame of reference which includes an inverted image, "above" optical axis "below" optical axis.

According to the present invention there is provided a system including a terrestrial imaging device in which an objective lens accepts light within an intrinsic angular field of view onto a focal plane. The center of the focal plane and the center of the objective lens form an optical axis. A first pair of plane mirrors includes a first mirror and a second mirror. The first mirror reflects a first light ray emanating from a terrestrial scene, thereby producing a first reflected light ray. The first reflected light ray is reflected again by the second mirror, thereby producing a second reflected light ray which is focused by the objective onto the focal plane. The first reflected light ray and the second reflected light ray form a first plane of reflection, which is substantially horizontal. The angle between the first light ray and the optical axis is substantially greater than half of the intrinsic angular field of view.

A second pair of plane mirrors includes a third mirror and a fourth mirror. The third mirror reflects a second light ray emanating from a terrestrial scene, thereby producing a third reflected light ray. The third reflected light ray is reflected by the fourth mirror, thereby forming a fourth reflected light ray which is focused by the objective on the focal plane. The third reflected light ray and the fourth reflected light ray form a second plane of reflection which is substantially vertical. The angle between the second light ray and the optical axis is less than or equal to half of the intrinsic angular field of view. The first pair and the second pair of plane mirrors are substantially disposed vertically on opposite sides of the optical axis. The first pair of plane mirrors preferably images a first image portion on the focal plane and the second pair of mirrors preferably images a second image portion on the focal plane. The horizontal angular field of view accepted to form both image portions is greater than the intrinsic angular field of view. The vertical angular field of view accepted to form both image portions is less than the intrinsic angular field of view. The horizontal angular field of view is preferably up to twice the intrinsic angular field of view. The vertical angular field of view is preferably not less than half the intrinsic angular field of view. The first pair and the second pair of plane mirrors are preferably assembled together with the terrestrial imaging device during manufacture of the system. Alternatively, the first pair and the second pair of mirrors are retrofit subsequent to assembly or manufacturing of the terrestrial imaging device. The terrestrial imaging device is an infrared camera, a visible light camera, binoculars, or a telescope. The intrinsic angular field of view of the terrestrial imaging device is typically greater than ten degrees.

BRIEF DESCRIPTION OF THE DRAWINGS

The invention is herein described, by way of example only, with reference to the accompanying drawings, wherein:

FIG. 1 illustrates the effect, according to an embodiment of the present invention, of increasing the horizontal field of view at the expense of the vertical field of view;

FIG. 2 illustrates schematically a mapping of field of view 11 onto a focal plane according to an embodiment of the present invention;

FIG. 2a illustrates an image received at the focal plane while using an embodiment of the present invention;

DESCRIPTION OF THE PREFERRED EMBODIMENTS

Figure 3:
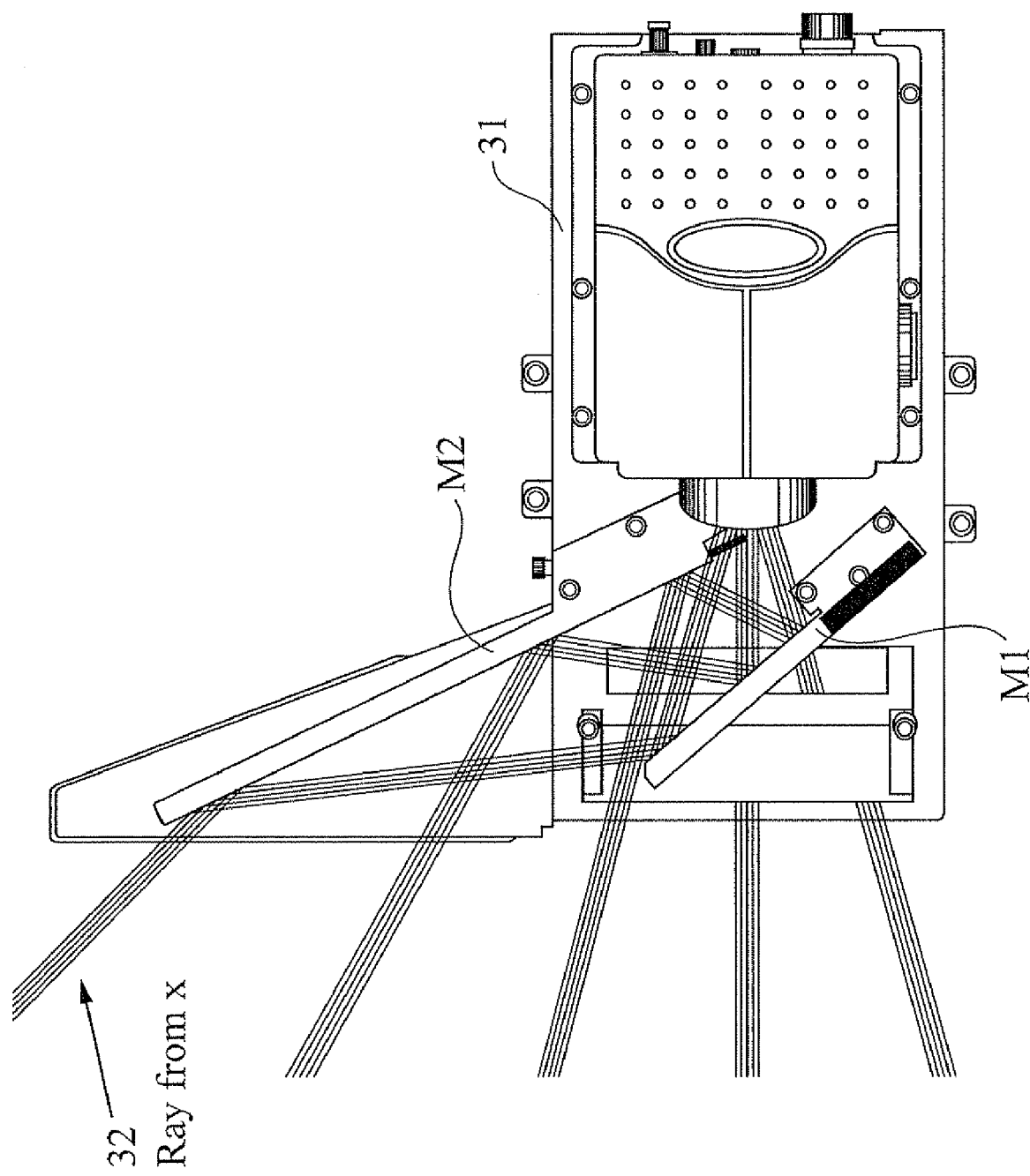
FIG. 3 is a top view of a system according to an embodiment of the present invention.

The present invention is a system which includes pairs of plane mirrors which when added onto and assembled with a standard camera increases the horizontal field of view of the camera at the expense of the vertical field of view.

The principles and operation of the system which when added onto and assembled with a standard camera increases the horizontal field of view of the camera at the expense of the vertical field of view, according to the present invention may be better understood with reference to the drawings and the accompanying description.

Before explaining embodiments of the invention in detail, it is to be understood that the invention is not limited in its application to the design details and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principle intention of the present invention is to increase the horizontal field of view typically for terrestrial observation at the expense of the vertical field of view which typically is of less interest in terrestrial surveillance systems. Another intention of the present invention is to use a conventional camera without modifying in any significant way the optics of the camera itself with the possible exception of removing an external flat window.

Figure 3A:
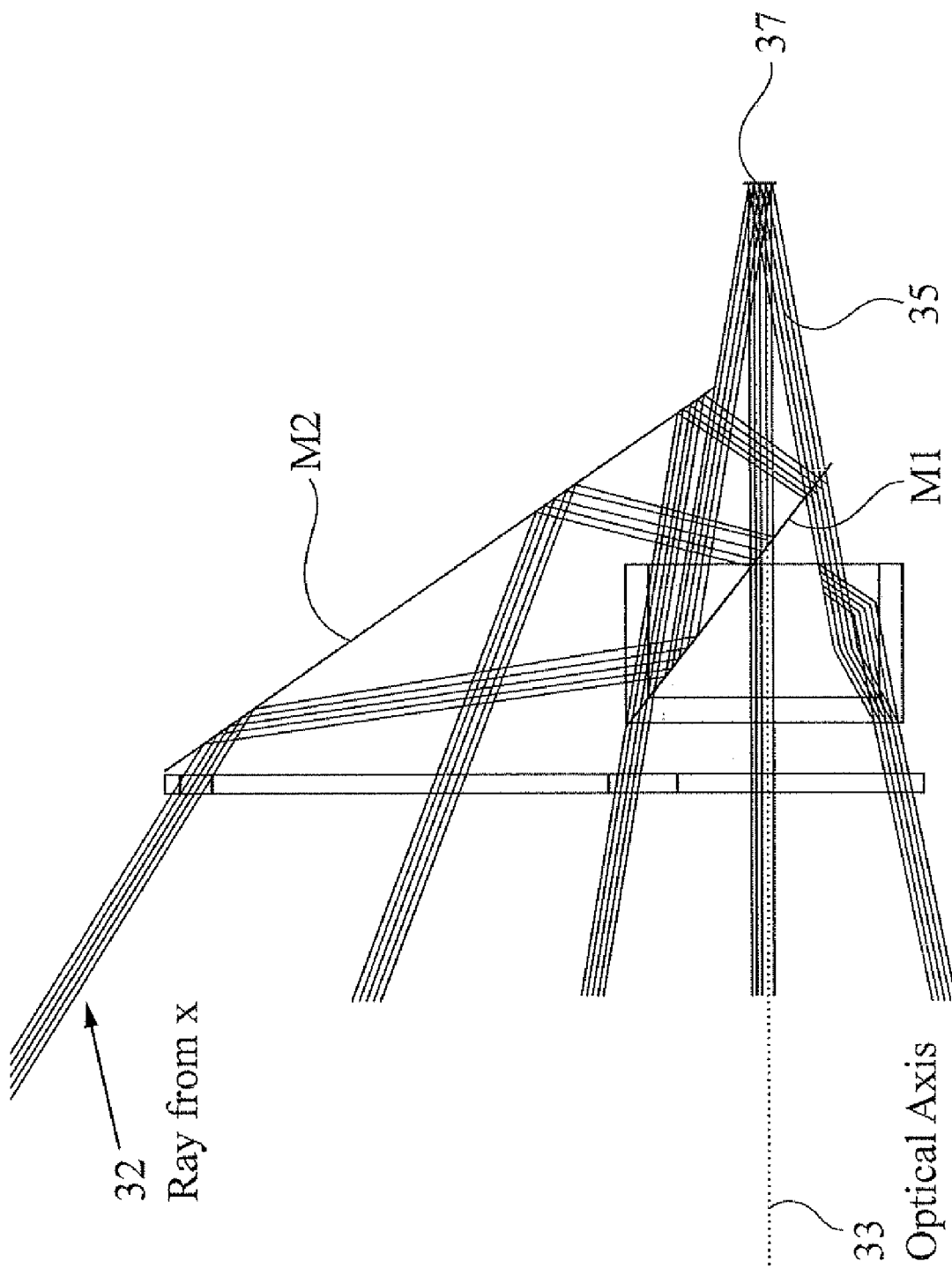
FIG. 3a illustrates a ray trace of the top view of the system of FIG. 3.

Referring now to the drawings, FIG. 1 illustrates the effect, according to an embodiment of the present invention, of increasing the horizontal field of view at the expense of the vertical field of view. FIG. 1 illustrates an exemplary field of view 10 accepted in a standard camera. Field of view 10 includes a horizontal field of view and a vertical field of view. Horizontal field of view is approximated by the horizontal distance h, e.g. 100 m of the viewed objects imaged in the camera divided by the distance d, e.g. 2000 m between the viewed objects to the camera. Vertical field of view is approximated by the vertical distance v, e.g. 20 meters, of the objects imaged in the camera divided by the distance d between the objects to the camera. FIG. 1 also illustrates an exemplary field of view 11 which is accepted when a system, according to embodiments of the present invention, is attached to the standard camera. It is readily seen the field of view 11 includes a smaller vertical field of view and a larger horizontal field of view compared with field of view 10. Reference is now made to FIG. 2, which illustrates schematically how field of view 11 is mapped onto a focal plane 20 of the standard camera As examples, point x in object space is horizontally mapped onto point x' in image space in focal plane 20, and point y in object space is vertically mapped onto point y' in image coordinates. In FIG. 2a an image 22 which receives field of view 11 is received at focal plane 20 of the standard camera. Image 22 and focal plane 20 are shown as noninverted even tough in the camera the images are inverted. FIG. 3 is a top view of a system 30 of standard camera 31 which performs the horizontal mapping, e.g. x→x' as performed using two plane mirrors M1 and M2. Reference is also made to FIG. 3a which includes a ray trace of system 30. Ray 32 is an optical ray from point x. Specifically, ray 32 from x is reflected by mirror M2 and then reflected again inward toward and through objective lens 35 and imaged at focal plane 37 of camera 31. Mirrors M1 and M2 are typically not parallel to each other and situated so that both M1 and M2 are disposed above (or both below) the optical axis with the plane of reflection being substantially horizontal. The lower edge of M1 (or upper edge) edge is typically situated near optical axis 33.

Figure 4:
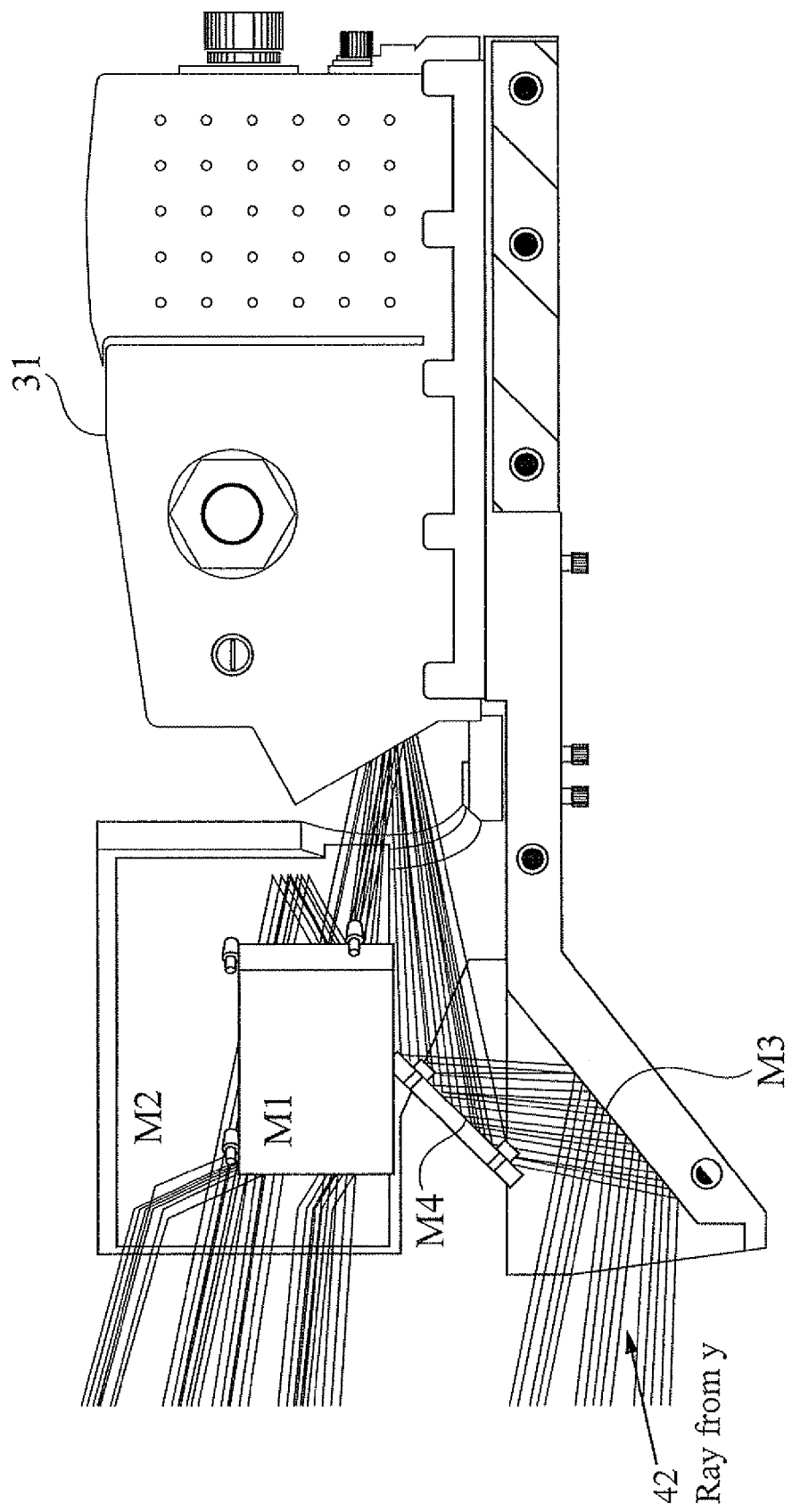
FIG. 4, is a side view of the system of FIG. 3, according to an embodiment of the present invention.
Figure 4A:
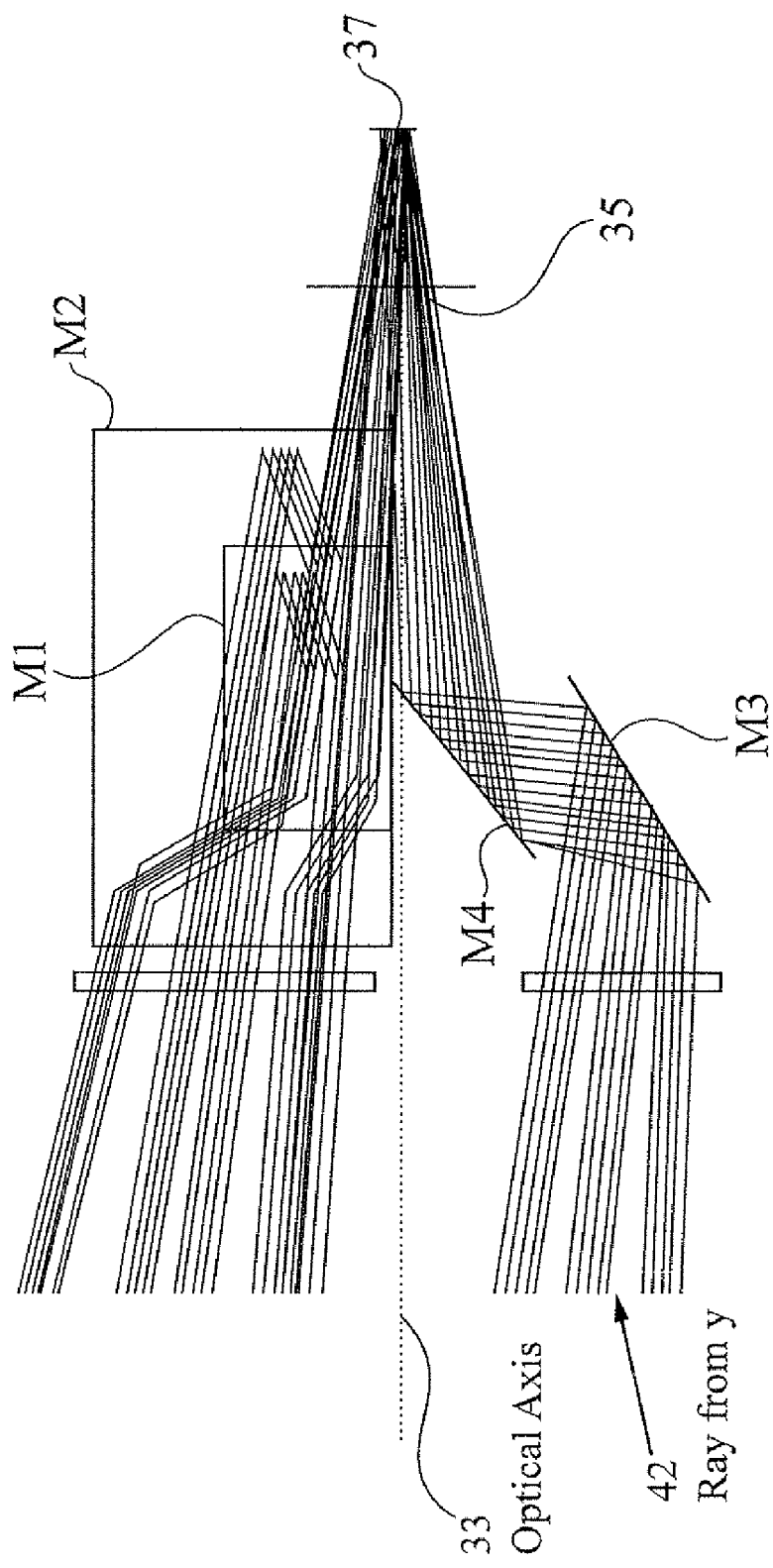
FIG. 4a illustrates a ray trace of the side view of the system of FIG. 3.

Reference is now made to FIG. 4, a side view of system 30 which include standard camera 31, and plane mirrors M1 and M2. In addition two additional plane mirrors M3 and M4 perform the vertical mapping of object coordinate y to image coordinate y'. Reference is also made to FIG. 4a, a ray trace of the side view of system 30. A ray 42 from point y is shown. Ray 42 is reflected from M3 upward toward M4 which reflects ray 42 through objective 35 and onto focal plane 37. The plane of reflection including ray 42 is essentially vertical The upper edge of M4 is situated near the optical axis.

With respect to the above description then, it is to be realized that all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A system comprising:
   (a) a terrestrial imaging device including an objective lens which accepts light within an intrinsic angular field of view onto a focal plane, wherein the center of said focal plane and the center of said objective lens form an optical axis;
   (b) a first pair of plane mirrors including a first mirror and a second mirror; wherein said first mirror reflects a first light ray emanating from a terrestrial scene, thereby producing a first reflected light ray, wherein said first reflected light ray is second reflected by said second mirror, thereby producing a second reflected light ray which is focused by the objective on the focal plane, wherein said first reflected light ray and said second reflected light ray form a first plane of reflection, wherein said first plane of reflection is substantially horizontal and wherein the angle between said first light ray and said optical axis is substantially greater than half of said intrinsic angular field of view; and (c) a second pair of plane mirrors including a third mirror and a fourth mirror, wherein said third mirror reflects a second light ray emanating from a terrestrial scene, thereby producing a third reflected light ray, wherein said third reflected light ray is reflected by said fourth mirror, thereby forming a fourth reflected light ray which is focused by the objective on the focal plane, wherein said third reflected light ray and said fourth reflected light ray form a second plane of reflection, wherein said second plane of reflection is substantially vertical and wherein the angle between said second light ray and said optical axis is less than or equal to half of said intrinsic angular field of view;

wherein said first pair and said second pair of plane mirrors are substantially disposed vertically on opposite sides of said optical axis.

2. The system of claim 1, wherein said first pair of mirrors images a first image portion on said focal plane and said second pair of mirrors images a second image portion on said focal plane, wherein the horizontal angular field of view accepted to form both image portions is greater than said intrinsic angular field of view and wherein the vertical angular field of view accepted to form both image portions is less than said intrinsic angular field of view.

3. The system of claim 2, wherein the horizontal angular field of view is up to twice said intrinsic angular field of view.

4. The system of claim 2, wherein the vertical angular field of view is not less than half said intrinsic angular field of view.

5. The system of claim 1, wherein said first pair and said second pair of mirrors are assembled together with said terrestrial imaging device during manufacture of the system.

6. The system of claim 1, wherein said first pair and said second pair of mirrors are retrofit subsequent to assembly of said terrestrial imaging device.

7. The system of claim 1, wherein said terrestrial imaging device is selected from the group consisting of: an infrared camera, and a visible light camera, and binoculars.

8. The system of claim 1, wherein said intrinsic angular field of view is greater than ten degrees.

* * * * *